United States Patent Office 3,631,217
Patented Dec. 28, 1971

3,631,217
PROCESS FOR INCREASING THE VISCOSITY OF POLYESTER RESINS, AND PRODUCTS OBTAINED THEREBY
Ronald R. Rabenold, Allison Park, Pa., assignor to PPG Industries, Inc., Pittsburgh, Pa.
No Drawing. Filed Mar. 9, 1967, Ser. No. 621,798
Int. Cl. C08f 21/02
U.S. Cl. 260—863
11 Claims

ABSTRACT OF THE DISCLOSURE

An improved process for effecting the thickening of an unsaturated polyester resin composition containing a chemical thickening agent, such as magnesium oxide, which consists of adding water to the resin composition in amounts of from about 0.1 percent to about 1.0 percent, based on the weight of the polyester resin. The presence of water, in such small amounts, greatly accelerates the rate of thickening of the resin composition, thereby allowing an extremely efficient means for the preparation of semi-solid, resin-impregnated sheet materials, such as those used in molding applications.

BACKGROUND OF THE INVENTION

Unsaturated polyester resins, that is, copolymerizable mixtures of (1) a polyester of an ethylenically unsaturated polycarboxylic acid and a polyhydric alcohol and (2) an ethylenically unsaturated monomer capable of cross-linking the polyester at points of unsaturation, are extensively utilized commercially as both molding resins and as coating resins. More recently, there has been considerable demand for such resins in the form of dry or semi-solid, heat-curable materials which can be utilized, for example, in molding applications. Accordingly, much attention has been given to the process of thickening such resin compositions.

The term "thickening" is used to describe the change in state of a resin composition from that of a low viscosity liquid to that of a high viscosity semi-solid. Ordinarily, the "thickened" resin composition has a viscosity above about 1,000,000 centipoise and in preferred form is usually a dry, semi-solid material. As such, the material can be heated, for example, during a molding application, to cure the resin. It should be noted, however, that this specific application is not to be considered as a limitation or narrowing of the term. That is, "thickening" is very broadly construed as describing any increase in viscosity of an unsaturated polyester resin composition which contains a chemical thickening agent.

The thickening characteristics of an unsaturated polyester resin composition are of the utmost importance in the production of resin-impregnated sheet materials, such as resin-impregnated glass fiber sheets utilized in matched dye molding. Numerous other materials such as paper or cloth and the like may be similarly prepared. The resulting sheet material, impregnated with uncured resin composition, is preferably prepared in the form of a dry or semi-solid material in order that it may be stored, shipped and utilized with a minimum of handling difficulties.

Numerous problems have resulted, however, in conventional processes for the preparation of such impregnated materials. In order to achieve adequate impregnation of sheet material, for example, it is necessary that the resin composition be of a sufficiently low viscosity such that it can satisfactorily wet the sheet material. But, once impregnation has been accomplished, it is further required that the resin viscosity be sufficiently high, or, alternatively, that the viscosity increase, such that segregation does not occur, i.e., such that the resin does not run off the sheet. Thus, it is essential that satisfactory thickening of the resin composition occurs after impregnation and prior to the curing of the resin.

One method developed for the thickening of unsaturated polyester resin compositions is that which employs powdered fillers, such as barytes, ground silica, etc., in the resin composition. A significant disadvantage of this method, however, is that such materials must by necessity be added to the resin composition in considerable bulk. As a result, both the physical and chemical properties of the finished impregnated sheet materials are affected thereby.

More recently, chemical thickening agents, which react with the polyester, have achieved considerable attention. Such materials can be utilized in relatively small amounts, cause a minimal effect on the clarity of the resin, and usually do not in any way affect the excellent chemical and physical characteristics normally associated with polyester resin compositions. A major drawback in the use of chemical thickening agents, however, is that they thicken the resin composition at a relatively slow rate.

At present, for example, the only chemical thickening agent which appears to thicken at anywhere near a satisfactory rate is magnesium oxide, as disclosed in U.S. Pat. No. 2,628,209. Even this compound, however, requires up to about three days to produce a dry, semi-solid, heat-curable resin composition, a period of time which does not allow the most efficient preparation of molding materials. Moreover, similar metal compounds of expected value as chemical thickening agents, such as calcium hydroxide, magnesium hydroxide, and the like, have been found to thicken at rates which are much slower than that obtained utilizing magnesium oxide.

SUMMARY OF THE INVENTION

It has now been discovered that the thickening rate of an unsaturated polyester resin composition which contains a chemical thickening agent can be significantly increased by conducting the thickening process in the presence of water, the amount of water present being above about 0.1 percent by weight, based on the total weight of the resin. This ingredient not only accelerates the thickening rate of systems utilizing magnesium oxide, but also enables the use of heretofore unsatisfactory metallic oxides and hydroxides such as calcium hydroxide, magnesium hydroxide, barium oxide, and the like. As a result, when water is added to the system in small amounts, it is possible to produce a dry, semi-solid unsaturated polyester resin product much more rapidly than when employing conventional chemical thickening techniques.

It is very surprising that water, in small amounts, acts to accelerate the thickening rate of such unsaturated polyester resin compositions, especially in view of the most pertinent references relating to this process. In U.S. Pat. No. 2,628,209, mentioned above, for example, and in similar literature in this area, there is no mention as to the use of such ingredient. It is known, of course, that conventional unsaturated polyester resin contain water in extremely small amounts, usually less than 0.05 percent by weight of the resin. This substance, however, was never considered as an ingredient of the resin composition or as being necessary to the thickening process. Consequently, although present thickening processes have utilized resins which do contain water, the amounts of this material have always been much less than is required to accelerate the thickening action. The role of water, therefore, as an accelerator of the thickening process, when used in amounts according to this invention, was completely unexpected.

Moreover, by conducting the thickening process in the presence of small amounts of water, within the ranges herein desclosed, it has been found that numerous other metal hydroxides and oxides can be utilized in commercially feasible applications. That is, compounds such as magnesium hydroxide, calcium hydroxide, zinc oxide, barium oxide, and the like, as well as combinations thereof, such as a combination of magnesium hydroxide and calcium hydroxide, can be employed to rapidly thicken unsaturated polyester resins.

As mentioned above, one of the most valuable applications to which the improved process of this invention pertains is that of the production of molding materials composed of an absorptive or porous sheet, such as a glass fiber mat, which is impregnated with an unsaturated polyester resin composition. By means of the greatly increased thickening rate of the resin composition, sheet material can be readily impregnated, by using a resin composition of low initial viscosity, and formed into a dry, semi-solid resin-impregnated product in a matter of a few hours. Moreover, when utilized in a molding process, the thickened resin composition exhibits no significant decrease in viscosity and, as a result, segregation of the components does not occur. Consequently, such molding materials can be employed, under conventional molding conditions, to provide uniformly reinforced molded articles of excellent physical and chemical properties.

In addition to the impregnation of sheet materials, such as glass fiber mats, the improved thickening process of this invention can also be utilized to produce conventional premix-type compounds, including those utilized in molding applications. For example, excellent molding compounds can be efficiently produced by impregnating chopped glass fibers. Similarly, various other conventionally utilized fillers, such as chalk, talc, or quartz powder and the like, can also be readily impregnated and thickened according to the process of this invention and advantageously used in a variety of molding applications.

Additionally, the increased efficiency in production occasioned by the utilization of water in the amounts herein disclosed is obtained without foregoing any of the desired properties normally associated with products obtained by means of the chemical thickening process. That is, the thickened resin composition, when used to impregnate sheet material or in the preparation of premix-type compounds, is a dry, non-tacky, semi-solid material which is completely satisfactory for molding and similar applications. Moreover, products prepared therefrom, such as, for example, molded parts, retain substantially all of the required qualities such as heat stability, chemical resistance, and good surface characteristics.

DESCRIPTION OF THE PREFERRED EMBODIMENTS

The thermosetting resin compositions to which the improved process of this invention pertains include unsaturated polyester resins which are copolymerizable mixtures of (1) a polyester of an ethylenically unsaturated polycarboxylic acid and a polyhydric alcohol, and (2) an ethylenically unsaturated monomer. The ethylenically unsaturated polycarboxylic acids include such acids as maleic acid, fumaric acid, aconitic acide, mesaconic acid, citraconic acid, itaconic acid, and the like, as well as halo and alkyl derivatives of such acids. A preferred acid for producing such resins is maleic acid.

The anhydrides of these acids, where the anhydrides exists are, of course, embraced under the term "acid" since the polyesters obtained therefrom are essentially the same, whether the acid or the anhydride is utilized in the reaction.

The polyhydric alcohols useful in preparing unsaturated polyester resins include, for example, ethylene glycol, diethylene glycol, triethylene glycol, polyethylene glycol, propylene glycol, diproplene glycol, polypropylene glycol, glycerol, neopentyl glycol, pentaerthritol, trimethylolpropane, trimethylolethane, and the like.

Additionally, saturated dicarboxylic acids may be utilized in combination with the unsaturated acid or anhydride in the preparation of unsaturated polyester resins. Such acids increase the length of the polyester without adding additional cross-linking sites, which is a desired feature in some polyesters. Examples of useful dicarboxylic acids which are either saturated or only aromatically unsaturated include, for example, succinic acid, adipic acid, suberic acid, azelaic acid, phthalic acid, isophthalic acid, terephthalic acid, and the like. As above, the anhydrides of these acids, where the anhydrides exist, are embraced in the term "acid." Furthermore, the aromatic nuclei of acids such as phthalic acid are generally regarded as saturated since the double bonds do not react by addition, as do ethylenic groups.

The ethylenically unsaturated polycarboxylic acids are conventionally employed in an amount of about 10 mole percent to about 100 mole percent, although preferably in an amount of about 20 mole percent to about 80 mole percent of the total moles of acid component in the polyester.

The polyhydric alcohols are generally employed in an equal molar ratio to the total acid components, or in a slight excess, as, for example, about 10 mole percent excess.

Polymerizable ethylenically unsaturated monomers which cross-link with unsaturated polyesters to form thermosetting resins include such monomers as styrene, divinyl benzene, vinyl acetate, allyl acetate, diallyl phthalate, diallyl succinate, diallyl adipate, diallyl sebacate, methyl acrylate, methyl methacrylate, hexyl acrylate, diallyl maleate, diallyl fumarate, and the like. Preferably, such monomers should be free of non-aromatic carbon-to-carbon conjugated double bonds and should contain a single $CH_2=C$ group.

The monomer component or components may be employed over a broad range but usually the proportion thereof, upon a weight basis, will be less than the polyester component. The amount of monomer should be sufficient to provide a liquid, flowable, interpolymerizable mixture. Usually, the percentage of monomer will fall within the range of about 10 percent to about 60 percent by weight of the total mixture of polyester and monomer. At the preferred range, the monomer is utilized in an amount of about 20 percent to about 50 percent.

Since the polyester component of the interpolymerizable mixture is often highly viscous or even solid at ambient temperatures, it is preferred to add the monomer thereto at a temperature sufficient to render the polyester satisfactorily fluid for incorporation with the monomer. This temperature is usually in the range of about 100° C. to about 120° C., which is sufficiently high, in the absence of polymerization (gelation) inhibitors, to induce premature gelation upon introduction of the monomer into the system. This is true even in the absence of polymerization catalysts.

Accordingly, it is especially preferred to include a gelation inhibitor with one or both components of the mixture. Suitable inhibitors may be selected from the quinonic or phenolic class or from a group of quaternary ammonium salts and salts of amines, particularly, amine halide salts. Suitable inhibitors of the quinonic or phenolic class include: p-benzoquinone, chloranil, hydroquinone, 3-isopropyl catechol, 4-t-butyl catechol, 3-methyl catechol, 4-ethyl catechol, 4-isopropyl catechol, and the like.

The following are representative examples of halide salts of amines which may be employed as inhibitors: trimethylamine hydrochloride, triethylamine hydrochloride, trimethylamine hydrobromide, dimethylaniline hydrochloride, N-benzylaniline hydrochloride, and the like.

Useful quaternary ammonium salts include: trimethyl benzyl ammonium chloride, trimethyl benzyl ammonium acid oxalate, di(trimethyl benzyl ammonium)oxalate, trimethyl benzyl ammonium tartrate, and the like. Other useful quaternary ammonium compounds and amine halides are disclosed in U.S. Pats. Nos. 2,593,787 and 2,646,416, respectively.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but preferably is present in a range of about 0.0001 percent to about 0.1 percent by weight, based upon the polyester component of the mixture.

Interpolymerizable mixtures of polyesters of ethylenically unsaturated polycarboxylic acids and monomers, containing an inhibitor as above described, may be stored over substantial periods of time, for example, several weeks or even months, without premature gelation.

When the interpolymerizable mixture is to be employed in the impregnation of glass fiber mats or other sheet material, or in the preparation of pre-mix type molding compounds, in accordance with the provisions of the present invention, there is employed a polymerization catalyst, conventionally a free-radical catalyst such as an organic peroxide, organic hydroperoxide, or esters thereof, and which may be activated by an accelerator. Typical organic peroxides useful as catalysts for unsaturated polyester resins include: benzoyl peroxide, acetyl peroxide, lauryl peroxide, methyl ethyl ketone peroxide, cyclohexanone peroxide, and the like.

Organic hydroperoxides or their esters with carboxylic acids useful as catalysts for unsaturated polyester resins include: cumene hydroperoxide, tertiary butyl hydroperoxide, hydroxycyclohexyl hydroperoxide, p-methane hydroperoxide, ditertiary butyl perphthalate, and the like.

Many other useful catalysts are disclosed in the monograph entitled, "Organic Peroxides," by A. V. Tovolsky and R. B. Mesrobian, copyrighted in 1954 by Interscience Publishers, Inc., New York, pages 158–163. These catalysts may be utilized in amounts of about 0.1 percent to about 5 percent by weight based upon the mixture of interpolymerizable materials. Naturally, the amount of the organic peroxide catalyst applicable in the practice of the invention will vary with the activity of the particular accelerator and with the amount of inhibitor present in the interpolymerizable mixture. Any free-radical polymerization catalyst can be employed and the use of such a catalyst is desirable in order to obtain a complete and thorough cure in the mixtures within reasonable periods of time and at reasonable temperatures.

For a thorough discussion of unsaturated polyester resin preparation, raw materials therefor, and appropriate polymerization catalysts, inhibitors, accelerators, and the like, see "Polyesters and Their Applications," by Bjorksten, Reinhold Publishing Corporation (1956), especially pages 21–73.

Chemical thickening agents utilized in the thickening process to which the improvement of this invention relates include alkaline earth metal compounds, such as the oxides and hydroxides of the elements in Group II–A of the Periodic Table. Typical examples of chemical thickening agents within this class are magnesium oxide, magnesium hydroxide, calcium oxide, calcium hydroxide, barium hydroxide, barium oxide, strontium hydroxide, strontium oxide and the like.

Additionally, various oxides and hydroxides of metals outside of the alkaline earth series can also be employed to chemically thicken the resin composition. Examples of these are: zinc oxide, potassium hydroxide, sodium hydroxide, and the like.

Although the nature of the reaction by means of which the chemical thickening agents function to increase the resin viscosity is not definitely known, it is believed that such compounds react so as to become attached at the ends of the polyesters. That is, the viscosity of the resin is increased by means of the lengthening of the polyester chain without attacking the unsaturation in the resin. As mentioned above, this action differs substantially from the effect caused by conventional non-chemical fillers, such as barytes, silica, etc., which are employed in considerable bulk. As a consequence, chemical thickening agents are employed in small amounts, usually less than about 10 percent by weight of the resin. All metal compounds, therefore, which chemically react with unsaturated polyester resins to increase their viscosity are contemplated as being within the scope of this invention.

It has been found that certain of the above chemical thickening agents function exceptionally well when used in the improved process of this invention. Especially preferred are magesium oxide, calcium hydroxide, zinc oxide, and combinations thereof, particularly the combination of calcium hydroxide and magnesium hydroxide.

The amounts of chemical thickening agents utilized in the unsaturated polyester resin composition can vary within wide limits, depending upon the formulation of the unsaturated polyester as well as other factors, such as, e.g., the resin viscosity or types of fillers employed therein. In general, it is sufficient that the chemical thickening agents be present in amounts of from 1 to 15 percent by weight, based on the resin, and preferably from 1 to 10 percent.

The improvement of the above-described process, i.e., the process of thickening an unsaturated polyester resin by means of the addition thereto of chemical thickening agents, is occasioned by conducting the thickening process in the presence of small amounts of water. Because such small amounts of water are employed, no special forms of water need be employed. That is, ordinary tap water appears to be equally as effective as distilled water or even deionized fater in greatly accelerating the thickening of the resin compositions.

The improved thickening process of this invention is easily carried out using conventional equipment and procedure. As should be clear from the above discussion, the only modification of the conventional thickening process is the utilization therein of water, in amounts of at least 0.1 percent by weight of the resin. Since it is only required that water be present during the thickening process, the manner or time of addition of such ingredient is not critical. For example, water can be added before or after the introduction of the chemical thickening agent, or water can be added or retained during the preparation of the unsaturated polyester resin. In other cases, the necessary amounts of water can be introduced into the resin by means of the addition thereto of water-containing clays, carbonates or similar materials.

Preferably, however, water is added to the resin at the same time that the chemical thickening agents are admixed therein. In this way, the amount of water added can be most easily controlled. Additionally, resin compositions can obviously be most effeciently formulated by means of a combination of such two additive steps. As a result of this specific manner of water addition, over-all economy in both formulation and thickening is achieved.

In accordance with the improved process of this invention, water is employed in an unsaturated polyester resin composition, which contains chemical thickening agents, in amounts of at least 0.1 percent of water based on the weight of the resin. The upper limit in the amount of water employed in the resin composition is primarily dependent upon the compatibility of the resin with water and also the physical and chemical characteristics sought in the finished porduct. In general, most resins can absorb up to about 1 percent by weight of water, although up to 2 percent by weight of water or more can also be added, with good results, depending upon the specific resin. Preferably, water is added to the unsaturated polyester resin composition in amounts up to about 1 percent, based on the weight of the resin.

Additional materials conventionally added to unsaturated polyester resins, such as pigments, dyes, waxes, release agents, and the like, may also be included in the resin composition. When such materials are used, it is usually most convenient to add the chemical thickening agent and water after such additional materials have been blended into the resin.

After the resin composition has been formulated as above, i.e., after both the chemical thickening agent and water have been added, the composition remains sufficiently low in viscosity to allow good impregnation to sheet material, filler material and the like. Shortly thereafter, the thickening of the resin composition proceeds at an extremely rapid pace, with substantially no cross-linking of the polyester, as a direct result of the action of the chemical thickening agent in combination with the water present in the composition. Usually, the resinous composition thickens to a dry, semi-solid form in less than one day. Depending upon the particular formulation, however, as well as the use of heat, which may tend to accelerate even further the thickening process, faster thickening times can be obtained.

The thickened unsaturated polyester resin composition can then be cured according to conventional procedures, for instance, at temperatures of from about 200° F. to 350° F. over a ½ to 5 minute period of time, with minimum decrease in viscosity.

The following examples illustrate in detail the method of practicing the instant invention. The examples are not intended to limit the invention, however, for there are, of course, numerous possible variations and modifications.

EXAMPLE I

A rapid thickening polyester resin composition, utilizing magnesium oxide as the chemical thickener, was prepared according to the method of this invention. The polyester was conventionally prepared from the following materials:

| Component: | Molar ratio |
|---|---|
| Maleic anhydride | 5.0 |
| Phthalic anhydride | 5.0 |
| Propylene glycol | 10.7 |

The resulting polyester, having an acid number of 30–40 and a viscosity (Gardner-Holdt) of O—Q, was blended with styrene in a weight ratio of 70:30 and in the presence of 0.009937 percent by weight of the polyester of hydroquinone. The resin thus obtained had a viscosity (Brookfield) of 2,200–2,500 c.p.s. at 77° F. To one portion of the above prepared resin was added, by admixing therein, 3 percent of highly calcined magnesium oxide and 0.1 percent of water, the percentages being based on the weight of the resin. A second portion of the resin was similarly prepared, except that instead of adding water to the resin, along with the chemical thickener, there was admixed therein benzoyl peroxide, in an amount of 1 percent by weight of the resin.

Both samples were stored in 2 ounce bottles which were maintained at room temperature for a 24 hour period. The resin composition to which no water had been added did not thicken. The resin composition containing water, however, became extremely thick.

EXAMPLE II

A resin composition was prepared from the following materials:

| Component: | Parts by weight |
|---|---|
| Polyester resin of Example I | 24.8 |
| Tertiary butyl perbenzoate | 0.754 |
| Zinc stearate | 0.991 |
| Magnesium silicate clay | 18.860 |
| Asbestos "float" grade | 4.960 |
| Calcium carbonate | 37.700 |
| ¼″ glass fibers | 11.932 |

To the above composition there was added, by admixing therein, 0.3 percent of magnesium oxides and 0.1 percent of water, the percentages being based on the weight of the polyester resin. A sample of this composition was then stored in a 2 ounce bottle at room temperature.

A second sample, substantially identical with that prepared above, except that no water had been added thereto, was also stored in a 2 ounce bottle under the same conditions as above.

The rate of thickening of the water-containing sample was observed to be significantly faster than that of the second sample, to which no water had been added. After a period of about 8 hours, the first sample had thickened to a semi-solid, dry condition, whereas the second composition was still tacky.

EXAMPLE III

A resin composition was prepared by adding calcium hydroxide and water to the polyester resin of Example I in the following proportions:

| Component: | Parts by weight |
|---|---|
| Polyester resin of Example I | 50.0 |
| Calcium hydroxide | 1.5 |
| Water | 0.05 |

A similar resin composition was prepared, with the exception being that only 0.05 percent by weight of the resin of water was added instead of 0.1 percent, as above. Each composition was then stored at 105° F. The composition prepared according to this invention, i.e., the one containing 0.1 percent of water, exhibited substantially faster thickening than the composition prepared utilizing only 0.05 percent water and resulted in a semi-solid state within about 4 hours. The other composition, after such period, was still liquid.

EXAMPLES IV–IX

Resin compositions were prepared according to this invention and utilizing magnesium oxide and calcium hydroxide thickeners. The compositions comprised either or both of Composition A and Composition B, having the following components:

Composition A

| Components: | Parts by weight |
|---|---|
| Polyester resin of Example I | 100.0 |
| Magnesium oxide | 3.0 |
| Benzoyl peroxide | 1.0 |
| Water | 1.0 |

Composition B

| Components: | Parts by weight |
|---|---|
| Polyester resin of Example I | 100.0 |
| Calcium hydroxide | 2.0 |
| Benzoyl peroxide | 1.0 |
| Water | 0.2 |

The resin compositions, as described in Table I below, were stored in 2 ounce bottles to determine their thickening properties:

TABLE I

| Example | Parts by weight Composition A | Parts by weight Composition B | Thickening time (hours) |
|---|---|---|---|
| 4 | 100 | 0 | 2 |
| 5 | 80 | 20 | 2½ |
| 6 | 60 | 40 | 3½ |
| 7 | 40 | 60 | 4½ |
| 8 | 20 | 80 | 6–20 |
| 9 | 0 | 100 | 20–24 |

As is evident from the above chart, various combinations of the two compositions, as well as each composition separately, are characterized by an extremely fast thickening rate.

EXAMPLE X

A polyester resin composition, Composition A, utilizing a combination of magnesium hydroxide and calcium hydroxide to chemically thicken the composition, was prepared according to the method of this invention The polyester resin was conventionally prepared from the following materials:

| Components: | Molar ratio |
|---|---|
| Maleic anhydride | 6.0 |
| Isophthalic anhydride | 4.0 |
| Dipropylene glycol | 8.0 |
| Propylene glycol | 2.0 |

The resulting polyester, having an acid number of about 40 and a viscosity (Gardner-Holdt) of P, was blended with styrene in a weight ratio of 72:28 and in the presence of 0.015 percent by weight of the polyester of methyl hydroquinone. To this resin was added 3.5 parts by weight of calcium hydroxide, 1.5 parts by weight of magnesium hydroxide and 0.4 part by weight of water.

A second resin composition, Composition B, utilizing the above polyester and chemical thickening agents, was prepared in substantially the same way, except that no water was added to the composition. The thickening rates of the composition were as follows:

TABLE II

| Resin composition | Viscosity (centipoise at 77° F.) vs. time | | | |
|---|---|---|---|---|
| | 0 hours | 2 hours | 4 hours | 24 hours |
| Composition A | 3,800 | 64,000 | 166,000 | 1,360,000 |
| Composition B | 2,400 | 2,600 | 3,570 | 4,600 |

As indicated by the results listed in Table II, Composition A, which was thickened in the presence of 0.4 percent by weight of the resin of water, according to the process of this invention, reached an extremely high viscosity in less than one day. Composition B, which was thickened in substantially the same manner as Composition A, except that water in amounts within the concept of this invention was not present in the resin composition, exhibited essentially no thickening within the same time period.

Similar results are obtainable utilizing various other chemical thickeners, such as zinc oxide or barium hydroxide, as well as combinations thereof similar to the use of magnesium hydroxide and calcium hydroxide as shown in the examples. Also, as mentioned above, any of a wide variety of polyester resins, including all conventional polyester resin formulations, can be used in the process of this invention. The utilization of water, in the amounts described, generally allows the preparation of rapid thickening and, therefore, extremely valuable thermosetting resin compositions.

I claim:

1. In a thickening process in which the viscosity of a liquid thermosetting resin composition comprising an unsaturated polyester and at least one ethylenically unsaturated monomer is increased by means of the utilization therein of a chemical thickening agent selected from the group consisting of the oxides and hydroxides of magnesium, calcium, barium, zinc, and strontium, the improvement which comprises:
 conducting the thickening process in the presence of at least about 0.1 percent by weight of water, based on the total weight of the unsaturated polyester and monomer components, said water comprising the trace amount normally present from the esterification reaction and an amount added to the composition after the esterification reaction.

2. The process of claim 1 wherein water is present in an amount between about 0.1 percent and 1.0 percent by weight, based on the total weight of the unsaturated polyester and monomer components.

3. The process of claim 1 in which the water is added to the resin composition along with the chemical thickening agent.

4. The process of claim 1 wherein the chemical thickening agent comprises a combination of calcium hydroxide and magnesium hydroxide.

5. A rapid thickening thermosetting resin composition comprising:
 (A) an unsaturated polyester comprising the reaction product of an ethylenically unsaturated polycarboxylic acid and a polyhydric alcohol,
 (B) an ethylenically unsaturated monomer, copolymerizable with the polyester,
 (C) a chemical thickening agent selected from the group consisting of the oxides and hydroxides of magnesium, calcium, barium, zinc, and strontium, and
 (D) water,
 the amount of water being at least about 0.1 percent by weight of the total weight of components (A) and (B).

6. The composition of claim 5 wherein the amount of water present is between about 0.1 percent and 1.0 percent by weight, based on the total weight of components (A) and (B).

7. The composition of claim 5 wherein the chemical thickening agent comprises a combination of calcium hydroxide and magnesium hydroxide.

8. The process of claim 1 wherein the chemical thickening agent is zinc oxide.

9. The composition of claim 5 wherein the chemical thickening agent is zinc oxide.

10. The process of claim 1 wherein water is added either at the same time as or simultaneously with the thickening agent.

11. A rapid thickening thermosetting resin composition comprising:
 (A) an unsaturated polyester comprising the reaction product of an ethylenically unsaturated polycarboxylic acid and a polyhydric alcohol,
 (B) an ethylenically unsaturated monomer, copolymerizable with the polyester,
 (C) a chemical thickening agent consisting of magnesium hydroxide, and
 (D) water,
 the amount of water being at least about 0.1 percent by weight of the total weight of components (A) and (B).

References Cited

UNITED STATES PATENTS

| 2,568,331 | 9/1951 | Frilette | 260—865 |
| 2,628,209 | 2/1953 | Fisk | 260—865 |
| 3,219,604 | 11/1965 | Fischer | 260—22 |
| 3,373,129 | 3/1968 | Kori et al. | 260—40 |
| 3,390,205 | 6/1968 | Schnell et al. | 260—863 |

WILLIAM H. SHORT, Primary Examiner

R. J. KOCH, Assistant Examiner

U.S. Cl. X.R.

260—22 CA, 40 R, 864, 865, 866, 867